United States Patent [19]

Shimizu et al.

[11] Patent Number: 4,862,398

[45] Date of Patent: Aug. 29, 1989

[54] CORRECTING METHOD AND CORRECTING ERRORS IN A TERRESTRIAL MAGNETISM HEADING SENSOR

[75] Inventors: Toshiyuki Shimizu; Osamu Shimizu; Kenji Tenmoku; Kunihiko Mitoh; Yasuhiro Honoki, all of Osaka, Japan

[73] Assignee: Sumitomo Electric Industries, Ltd., Japan

[21] Appl. No.: 119,966

[22] Filed: Nov. 13, 1987

[30] Foreign Application Priority Data

Nov. 18, 1986 [JP] Japan ............................ 61-275003
Jan. 8, 1987 [JP] Japan ............................ 62-2166
Oct. 12, 1987 [JP] Japan ............................ 62-256629

[51] Int. Cl.$^4$ ............................................. G01C 17/38
[52] U.S. Cl. ........................... 364/571.05; 33/356; 33/361; 364/457; 364/449
[58] Field of Search ........... 364/449, 454, 457, 571.05; 33/356, 357, 361, 363 R, 363 Q

[56] References Cited

U.S. PATENT DOCUMENTS

| | | | |
|---|---|---|---|
| 4,429,469 | 2/1984 | Tsushima et al. | 33/356 |
| 4,470,119 | 9/1984 | Hasebe et al. | 364/449 |
| 4,539,760 | 9/1985 | Marchent et al. | 33/356 |
| 4,555,761 | 11/1985 | Matsumoto et al. | 33/356 |
| 4,688,176 | 8/1987 | Hirata | 364/449 |
| 4,729,172 | 3/1988 | Alberter et al. | 33/356 |
| 4,738,031 | 4/1988 | Alberter et al. | 33/356 |
| 4,771,547 | 9/1988 | Akutsu et al. | 33/356 |

OTHER PUBLICATIONS

Development of "NAVICOM"; Toyota Technique No. 34, vol. 2; pp. 45-52, published Dec. 1984.

*Primary Examiner*—Gary Chin
*Attorney, Agent, or Firm*—Lane and Aitken

[57] ABSTRACT

In a location detecting apparatus which detects the location of a moving body on the basis of the heading signal from a terrestrial magnetism heading sensor attached to the moving body and the rotational angle signal from a rotational angle sensor attached to the moving body, a correcting method for correcting errors in a terrestrial magnetism heading sensor, comprising the steps of: detecting the amount of a heading change of the moving body that is made when the moving body turns a curve, and detecting a magnetized amount of the moving body on the basis of the detected amount of a heading change, an output from the terrestrial magnetism heading sensor before the heading change is made and an output from the terrestrial magnetism heading sensor after the heading change is made.

11 Claims, 7 Drawing Sheets

FIG. 16 ed amount before the vehicle actually travels, but in the case that the vehicle is newly magnetized during actual vehicle travel, there is high possibility that the heading data cannot be corrected on the basis of the newly magnetized amount. Therefore, there is high possibility that the accuracy of vehicle location detection will be greatly reduced.

More specifically, in the aforementioned method, it is necessary that a vehicle is turned 360 degrees, but there is no guaranty that, in actual vehicle travel, there exists a space for the turning of 360 degrees. If the space does not exist, the detection of vehicle location is made without correction based o the newly magnetized amount. Particularly, in actual vehicle travel, in passing through the strong magnetic field of rail crossings and the like, the vehicle may be newly magnetized. When the vehicle is newly magnetized, since the magnetized amounts dx1 and dy1 of the vehicle are changed to dx2 and dy2, the dx1 and dy1 must be corrected to the dx2 and dy2 in order to accurately detect the vehicle location.

If, therefore, correction is made not by the new magnetized amounts dx2 and dy2 but by the previous magnetized amount dx1 and dy1, the correction values are selected independently of the actually magnetized amounts. As a result, it is difficult to detect an accurate vehicle location.

Accordingly, it is an object of the present invention to provide an improved method which is capable of correcting heading errors resulting from the magnetized vehicle by the magnetic field other than terrestrial magnetism.

Another object of the invention is to provide an improved method which is capable of correcting readily and accurately errors in a terrestrial magnetism heading sensor that result from the magnetized vehicle by the magnetic field other than terrestrial magnetism, without the turning travel of 360° of a vehicle.

SUMMARY OF THE INVENTION

The foregoing objects are accomplished in accordance with the present invention by providing, in a location detecting apparatus which detects the location of a moving body on the basis of the heading signal from a terrestrial magnetism heading sensor attached to the moving body and the rotational angle signal from a rotational angle sensor attached to the moving body, a correcting method for correcting errors in a terrestrial magnetism heading sensor, comprising the steps of: detecting the amount of a heading change of the moving body that is made when the moving body turns a curve, and detecting a magnetized amount of the moving body on the basis of the detected amount of a heading change, an output from the terrestrial magnetism heading sensor before the rotational angle signal from the rotational angle sensor. The amount of a heading change may also be detected on the basis of a present location of the moving body which is located on road map. The moving body may comprise a vehicle.

Also, the foregoing objects are accomplished in accordance with the present invention by providing, in a location detecting apparatus which detects the location of a moving body on the basis of the heading signal from a terrestrial magnetism heading sensor attached to the moving body and the rotational angle signal from a rotational angle sensor attached to the moving body, a correcting method for correcting errors in a terrestrial magnetism heading sensor, comprising the steps of:

CORRECTING METHOD AND CORRECTING ERRORS IN A TERRESTRIAL MAGNETISM HEADING SENSOR

FIELD OF THE INVENTION

This invention relates in general to a correcting method for correcting errors in a terrestrial magnetism heading sensor, and in particular, to such a method which is applied to a location detecting apparatus which detects the location of a moving body on the basis of the heading signal from a terrestrial magnetism heading sensor attached to the moving body and the rotational angle signal from a rotational angle sensor attached to the moving body.

DESCRIPTION OF THE PRIOR ART

As a conventional vehicle location detecting system, there has been proposed a system which uses the principle of dead reckoning and which includes a distance sensor, a direction or heading sensor, and processing units for giving necessary processes to output signals from the distance and heading sensors. In the dead reckoning, data regarding the present location of a vehicle is obtained by adding the amount of changes in distance and heading to a last-known location data. However, there is the drawback that the distance and heading errors that are inevitably inherent in the distance and heading sensors are accumulated with vehicle travel, and errors in the present location data are also accumulated.

Particularly, in the case that a terrestrial magnetism heading sensor is employed as the aforementioned heading sensor, if the vehicle is not magnetized at all, an accurate heading detection signal can be outputted on the basis of the correlation between the terrestrial magnetism and the sensor. However, since it is rare that a vehicle is not magnetized at all, and since a vehicle is magnetized in a greater or less degree, the heading detected by the terrestrial magnetism heading sensor is greatly departed from the actual heading of the vehicle due to the magnetized vehicle.

Figures 1, 2, 3:
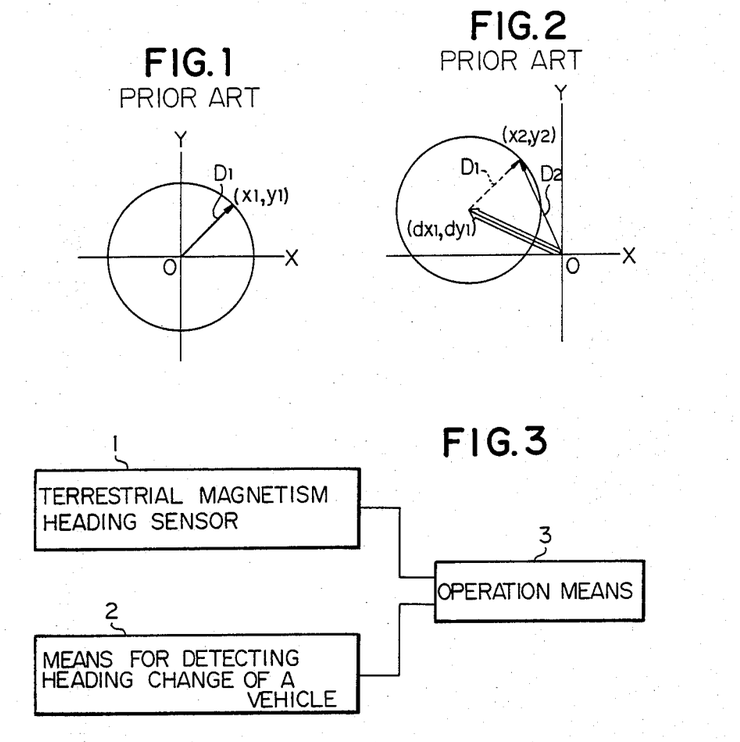
FIG. 1 is a view showing output of the terrestrial magnetism heading sensor in the condition that a vehicle is not magnetized at all, the center of a terrestrial magnetism heading circle coinciding with the origin of coordinates.
FIG. 2 is a view showing output of the terrestrial magnetism heading sensor in the condition that a vehicle is magnetized, the center of the terrestrial magnetism heading circle being departed from the origin of coordinates.
FIG. 3 is a block diagram showing the construction of one apparatus for carrying out a correcting method for correcting errors in a terrestrial magnetism heading sensor in accordance with the present invention.

More specifically, in the condition that a vehicle is not magnetized at all, the center of a terrestrial magnetism heading circle coincides with the origin of coordinates (see FIG. 1). Thus, an accurate heading vector D1 can be obtained on the basis of the output data (x1, y1) from the terrestrial magnetism heading sensor.

But, in the condition that a vehicle is magnetized, the center of the terrestrial magnetism heading circle is departed from the origin of coordinates (see FIG. 2). Therefore, the heading vector D2 obtained on the basis of the output data (x2, y2) from the terrestrial magnetism heading sensor is greatly departed from the accurate heading vector D1, so that it is difficult to detect an accurate vehicle location.

In order to eliminate the aforementioned drawback, there has been proposed a method wherein a vehicle turns 360 degrees before it actually travels, the magnetized amounts dx1 and dy1 of the vehicle are detected on the basis of the output circle resulting from the turning of 360 degrees, and in actual vehicle travel thereafter, an accurate heading data is obtained by making correction based on the detected magnetized amounts (Toyota Technique No. 34 volume, No. 2, "Nabicon", December, 1984).

However, in the aforementioned correcting method, the heading data can be corrected on the basis of the detecting a magnetized amount of the moving body on the basis of a heading of the moving body and a radius of a terrestrial magnetism heading circle, and correcting the heading signal on the basis of the detected magnetized amount. The heading of the moving body may be detected on the basis of the rotational angle signal from the rotational angle sensor. The heading of the moving body may also be detected on the basis of a present location of the moving body which is located on road map. It may be determined whether the moving body is located on road which is shown in road map, in the case that the moving body is located on the road, the heading of the moving body may be detected on the basis of a present location of the moving body on road map data, and in the case that the moving body is not located on the road, the heading of the moving body may be detected on the basis of the rotational angle signal from the rotational angle sensor. The moving body may comprise a vehicle.

Also, the foregoing objects are accomplished in accordance with the present invention by providing, in a location detecting apparatus which detects the location of a moving body on the basis of the heading signal from a terrestrial magnetism heading sensor attached to the moving body and the rotational angle signal from a rotational angle sensor attached to the moving body, a correcting method for correcting errors in a terrestrial magnetism heading sensor, comprising the steps of: detecting a magnetized amount of the moving body on the basis of a heading of the moving body and a radius of a terrestrial magnetism heading circle, and if the moving body curves, detecting a magnetized amount of the moving body on the basis of an amount of heading change when the moving body curves and two output signals from the terrestrial magnetism heading sensor before and after the moving body curves, and correcting the heading signal on the basis of the detected magnetized amount. The heading of the moving body may be detected on the basis of the heading signal from the terrestrial magnetism heading sensor. The heading of the moving body may also be detected on the basis of a present location of the moving body which is located on road map. It may be determined whether the moving body is located on road which is shown in road map, in the case that the moving body is located on the road, the heading of the moving body may be detected on the basis of a present location of the moving body on road map data, and in the case that the moving body is not located on the road, the heading of the moving body may be detected on the basis of the rotational angle signal from the rotational angle sensor. The moving body may comprise a vehicle.

BRIEF DESCRIPTION OF THE DRAWINGS

The drawbacks of a prior-art correcting method for correcting errors in a terrestrial magnetism heading sensor and the features and advantages of a correcting method for correcting errors in a terrestrial magnetism heading sensor in accordance with the present invention will be more clearly understood from the following description taken in conjunction with the accompanying drawings in which.

DESCRIPTION OF PREFERRED EMBODIMENTS

Referring to FIG. 3 of the drawings, there is shown the construction of one apparatus for carrying out a correcting method for correcting errors in a terrestrial magnetism heading sensor in accordance with the present invention. The apparatus includes a terrestrial magnetism heading sensor 1, and means 2 for detecting the heading change of a vehicle, for example, a wheel velocity sensor. The data from the terrestrial magnetism heading sensor 1 and wheel velocity sensor 2 are inputted to operation means 3.

Figure 4:
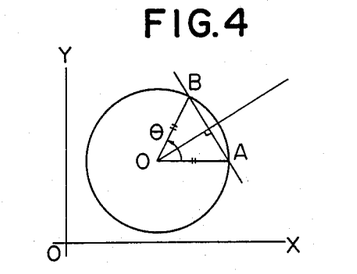
FIG. 4 is a view showing output change of the terrestrial magnetism heading sensor when the heading change of a vehicle is made.

FIG. 4 illustrates output change of the terrestrial magnetism heading sensor 1 when the heading change of a vehicle is made. As the vehicle is turned by $\theta$, the output of the terrestrial magnetism heading sensor 1 is changed from A indicated in FIG. 4 to B. If the radius of a heading circle of the terrestrial magnetism heading sensor 1 is not changed before and after the heading change is made, as clearly shown in FIG. 4, the center 0 of the heading circle is the vertex of an isosceles triangle with a base AB and a vertical angle $\theta$. Accordingly, if the amount of heading change $\theta$ and rotational direction of the vehicle, the output A of the terrestrial magnetism heading sensor 1 before the heading change is made, and the output B of the terrestrial magnetism heading sensor 1 after the heading change is made are obtained, the center of the heading circle, that is, the magnetized amount can be obtained.

The terrestrial magnetism heading sensor outputs A and B are detected by the terrestrial magnetism heading sensor 1, the $\theta$ is detected by the means 2 for detecting the heading change of a vehicle, and as shown in FIG. 3, on the basis of these data, the magnetized amount is obtained by the aforementioned principle.

On the basis of the aforementioned principle, the present invention will be described in conjunction with the embodiment shown in FIGS. 5, 6, 7 and 8.

Figures 5, 7:
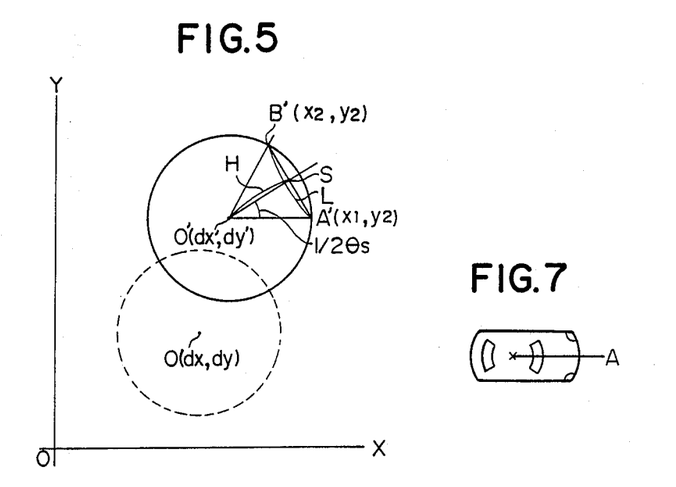
FIG. 5 is a view showing the output change of the terrestrial magnetism heading sensor when the vehicle is newly magnetized.
FIG. 7 illustrates the condition that the vehicle is not turned.
Figure 6:
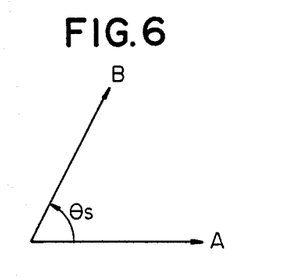
FIG. 6 illustrates the amount of the heading change detected by the terrestrial magnetism heading sensor when the vehicle is turned by 8.

FIG. 5 illustrates the output change of the terrestrial magnetism heading sensor when the vehicle is newly magnetized. It is assumed that the vehicle is newly magnetized during vehicle travel and the magnetized amounts dx and dy are changed to dx' and dy', respectively. Also, it is assumed that the relatively stable terrestrial magnetism heading sensor output before the vehicle curves is A'(x1, y1) and the relatively stable terrestrial magnetism heading sensor output after the vehicle curves is B' (x2, y2).

Figure 8:
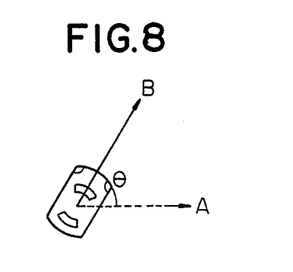
FIG. 8 illustrates the condition that the vehicle is turned anticlockwise from the position shown in FIG. 7.

First, the terrestrial magnetism heading sensor output A' (x1, y1) is memorized in the operation means 3. Next, when the heading change is made, the amount of the heading change $\theta$ is determined by the wheel velocity sensor 2 of the left and right wheels (see FIG. 6). FIG. 7 illustrates the vehicle that is not turned, and FIG. 8 illustrates the vehicle that is turned anticlockwise by an angle of $\theta$. It is assumed that the heading change $\theta s$ detected by the wheel velocity sensor 2 is equal to the angle $\theta$. After the heading change is made, the output B' (x2, y2) of the heading sensor is obtained.

Then, if the coordinates S(Sx, Sy) of the middle point S between A' and B' and the length L between A' and B' are defined by the following equations $$S(Sx, Sy)=((x1+x2)/2, (y1+y2)/2)$$

$$\text{Length } L=((x1-x2)^2+(y1-y2)^2)^{\frac{1}{2}},$$

the length H between the center 0' of the heading circle and the middle point S between A' and B' can be calculated by the following equation:

$$H=(L/2)/\tan(\theta s/2).$$

And, if the direction $\theta_{A'B'}$ of the vector A'B' and the direction $\theta_{SO}$, of the vector SO' are defined by the following equations:

$$\theta_{A'B'}=\tan^{-1}((y2-y1)/(x2-x1))$$

$\theta_{SO}=\theta A'B' + \pi/2$, the center O' (dx', dy') of the magnetized amount can be calculated by the following equation:

$$(dx', dy')=(Sx+H\cos(\theta_{SO\prime}), Sy+H\sin(\theta_{SO\prime})).$$

While it has been described that the heading change is detected by the wheel velocity sensor, it is noted that the heading change may also be detected by other rotational angle sensors or on the basis of the present location of a vehicle which is located on road map. When the vehicle is newly magnetized, the heading of the vehicle is detected by the rotational angle sensor until the new magnetized amount is calculated in accordance with the present invention. Since the rotational angle sensor cannot be used for a period of long time because the errors in the heading detected by the rotational angle sensor are accumulated, it is necessary that the rotational angle sensor is quickly replaced with the terrestrial magnetism heading sensor which is capable of detecting absolute heading. While the computation of the correction amount has been described in the case that the vehicle turns one curve, it is noted that higher accurate magnetized amount can be obtained by using data regarding curves wherein there is the amount of the heading change of a vehicle or by obtaining the average value of data regarding the centers of heading circle by using data when the vehicle was turned many times.

Figure 9:
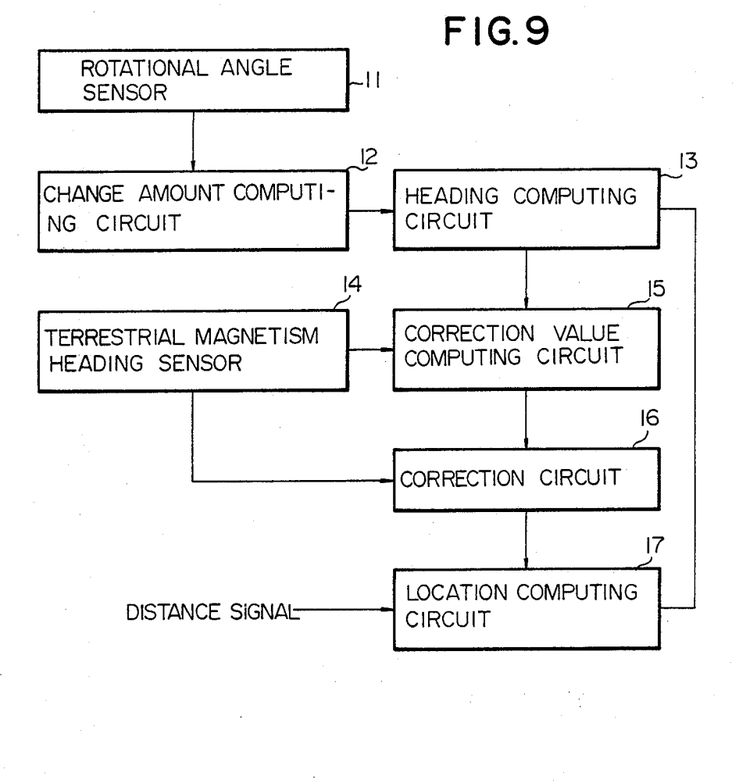
FIG. 9 is a block diagram showing the construction of another apparatus for carrying out a correcting method for correcting errors in a terrestrial magnetism heading sensor in accordance with the present invention.

Referring to FIG. 9, there is shown the construction of another apparatus for carrying out a correcting method for correcting errors in a terrestrial magnetism heading sensor in accordance with the present invention. The apparatus comprises a rotational angle sensor 11 (for example, a wheel velocity sensor), a change amount computing circuit 12 for computing the amount of the heading change of a vehicle upon a rotational angle signal from the rotational angle sensor 11, a heading computing circuit 13 for computing a present heading of the vehicle upon a heading change signal from the change amount computing circuit 12, a terrestrial magnetism heading sensor 14, a correction value computing circuit 15 for computing the center coordinates of a terrestrial magnetism heading circle upon a heading signal from the heading computing circuit 13 and a heading signal from the terrestrial magnetism heading sensor 14 and for outputting the computed center coordinates as a correction value, a correction circuit 16 for producing a corrected heading signal upon the heading signal from the terrestrial magnetism heading sensor 14 and a correction value signal from the correction value computing circuit 15, and a location computing circuit 17 for computing the present location of a vehicle upon either of the heading signal from the heading computing circuit 13 and the corrected heading signal from the correction circuit 16, and upon a distance signal (which is produced on basis of the output signal from the wheel velocity sensor not shown).

More particularly, the aforementioned change amount computing circuit 12 maintains the output signal from the rotational angle sensor 11 and computes the amount of the heading change of a vehicle by computing the difference between the present output signal and the previous output signal. The aforementioned heading computing circuit 13 integrates the amount of the heading change obtained by the change amount computing circuit 12 and computes the heading signal by adding a reference value if necessary. On the basis of the heading signal from the terrestrial magnetism heading sensor 14, the aforementioned correction value computing circuit 15 computes a point which is located on the radius of a terrestrial magnetism heading circle in the direction which is spaced 180 degrees from the heading obtained by the heading computing circuit 13 and outputs the computed point as a correction value. The aforementioned correction circuit 16 produces an accurate heading signal by subtracting the aforesaid correction value from the heading signal outputted from the terrestrial magnetism heading sensor 14. The aforementioned location computing circuit 17 computes the present location of a vehicle on the basis of the heading signal outputted from the heading computing circuit 13 and the distance signal, until the correction is made. After the correction is made, the location computing circuit 17 computes the present location of a vehicle on the basis of the accurate heading signal outputted from the correction circuit 16 and the distance signal.

The operation of the location detecting apparatus constructed as described above will hereinafter be described in detail.

Figure 10:
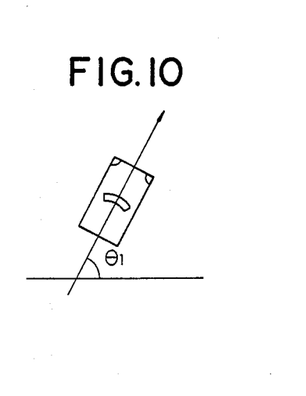
FIG. 10 is a view showing the condition that the vehicle is travelling in the direction of a heading $\theta 1$.
Figure 11:
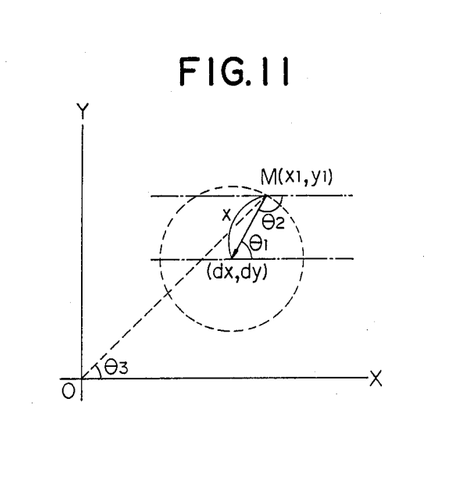
FIG. 11 is a view showing the output of the terrestrial magnetism heading sensor shown in FIG. 9 when the vehicle shown in FIG. 10 is magnetized.

In the case that the vehicle was magnetized when travelling in the direction of a heading $\theta 1$ shown in FIG. 10, the output M of the terrestrial magnetism heading sensor 14 is shown by M(x1, y1) in FIG. 11 because the heading sensor 14 is subjected to the influence of the magnetized vehicle.

This output M indicates the heading $\theta 1$ with respect to the center of the terrestrial magnetism heading circle (shown by the broken line in FIG. 11) which is moved because of the influence of the magnetized vehicle and a heading $\theta 3$ with respect to the origin of coordinates.

However, if the amount of the heading change of a vehicle is computed, on the basis of the rotational angle signal from the rotational angle sensor 11, by the change amount computing circuit 12, and the present heading of the vehicle is computed, on the basis of the change amount signal from the change amount computing circuit 12, by the heading computing circuit 13, the aforesaid heading $\theta 1$ can be obtained. Although there exists a little error, the heading $\theta 1$ can be regarded as an accurate heading because the error is extremely small as compared with errors in the terrestrial magnetism heading sensor 14. And, in the correction value computing circuit 15, on the basis of the heading signal (x1, y1) from the terrestrial magnetism heading sensor 14, the point (dx, dy), which is spaced by the radius x of the terrestrial magnetism heading circle in the direction which is spaced 180 degrees from the heading $\theta 1$ obtained by the heading computing circuit 13, can be computed and outputted as a correction value. If $\theta 2$ (shown in FIG. 11) $= \theta 1 - 180°$, the dx and dy can be calculated as $$dx = x1 + x \cos(\theta 2),$$

$$dy = y1 + x \sin(\theta 2).$$

Accordingly, in the aforementioned correction circuit 16, an accurate heading signal can be obtained by subtracting the aforesaid correction value (dx, dy) from the heading signal (x1, y1) from the terrestrial magnetism heading sensor 14.

And, in the aforementioned location computing circuit 17, the present location of a vehicle can be computed on the basis of the aforesaid accurate heading signal from the correction circuit 16 and the distance signal.

Also, until the aforesaid correction value (dx, dy) is obtained, the present location of a vehicle is computed on the basis of the heading signal from the heading computing circuit 13 and the distance signal because the output signal M from the terrestrial magnetism heading sensor 14 cannot be used.

Figure 12:
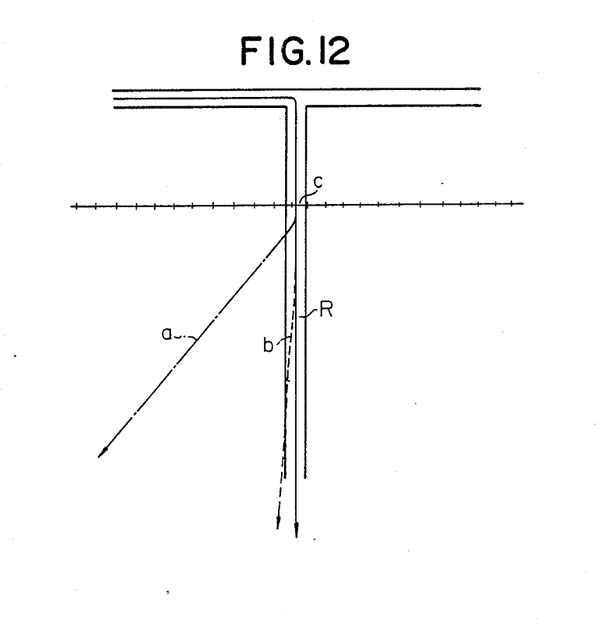
FIG. 12 is a schematic view illustrating the condition that the vehicle is traveling along road R, which traverses a rail crossing C, in the direction indicated by the solid line therein.

FIG. 12 schematically illustrates the condition that the vehicle is traveling along road R, which traverses a rail crossing C, in the direction indicated by the solid line therein.

In this case, when the vehicle passes the rail crossing C, a large magnetized amount occurs, and therefore, the heading a (shown by the broken line in FIG. 12) detected by the terrestrial magnetism heading sensor 14 is greatly departed from the heading of the road R.

But, even this case, the heading b (shown by the broken line in FIG. 12) computed on the basis of the output signal from the rotational angle sensor 11 is substantially equal to the heading of the road R. Accordingly, on the basis of the computed heading b, a correction value with respect to the output signal from the terrestrial magnetism heading sensor 14 is computed, and thereafter, the present location of the vehicle can be detected on the basis of the output signal from the terrestrial magnetism heading sensor 14. More specifically, until the heading b is greatly departed from the heading of the road R after the vehicle passed the rail crossing R, the detection of the present location is made on the basis of the heading b, and the correction value with respect to the output signal from the terrestrial magnetism heading sensor 14 is computed. After the correction value is computed, the output signal from the terrestrial magnetism heading sensor 14 is corrected on the basis of the correction value and an accurate heading is obtained. Upon the accurate heading, the detection of the present location can be made.

It is noted that this invention is not limited to the aforementioned embodiment. For example, while it has been described that the correction value with respect to the terrestrial magnetism heading sensor 14 is computed on the basis of the heading b computed from the output signal from the rotational angle sensor 11, it is noted that, on road map which is stored as digital data, the correction value may also be computed on the basis of the heading of the road on which the vehicle is located. Also, it is determined whether a vehicle is located on the road which is stored as digital data, and the correction value with respect to the terrestrial magnetism heading sensor 14 may be computed on the basis of the heading of the road in the case that the vehicle is located on the road, and the aforesaid heading b in the case that the vehicle is not located on the road. Furthermore, a plurality of data are sampled by the terrestrial magnetism heading sensor 14, and by filtering or averaging the plurality of sample data to exclude the influence of deviation, etc. resulting from an elevated road, a bridge and the like, location output located on an accurate terrestrial magnetism heading circle can be obtained.

Figure 13:
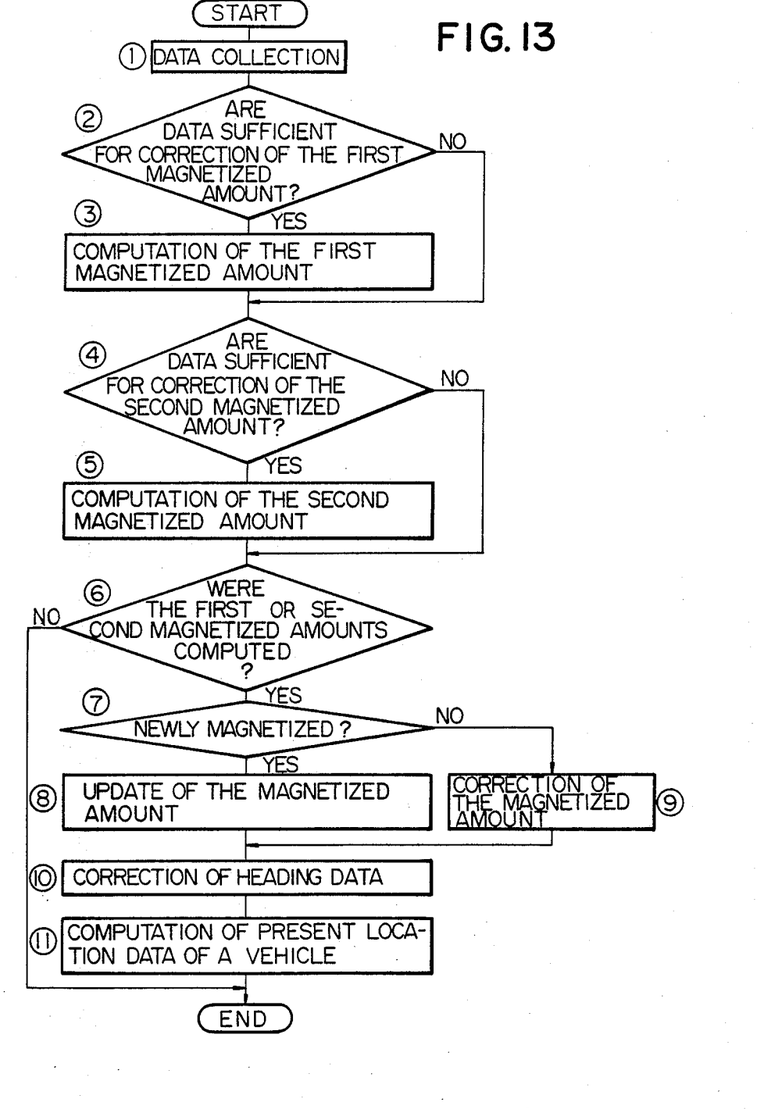
FIG. 13 illustrates a flow chart representing the essential steps in another preferred method of carrying out the present invention.

FIG. 13 illustrates a flow chart representing the essential steps in another preferred method of carrying out the present invention. At a step 1, the output data from a terrestrial magnetism heading sensor and the output data from a rotational angle sensor are periodically collected. At a step 2, it is determined whether a sufficient amount of data are collected for correction of a first magnetized amount. Similarly, at a step 4, it is determined whether a sufficient amount of data are collected for correction of a second magnetized amount. In the case that it was determined that sufficient data were not collected for the correction of a first magnetized amount, determinations and processes in the steps following the step 4 will be made.

In the case that, at the step 2, it was determined that a sufficient amount of data were collected for the correction of a first magnetized amount, the first magnetized amount is computed at a step 3 on the basis of the heading data of a vehicle and the heading data outputted from the terrestrial magnetism heading sensor, that is, on the basis of the heading data and the data regarding the radius of a terrestrial magnetism heading circle, and the determination of the aforesaid step 4 is made. In the case that, at the step 4, it was determined that a sufficient amount of data were collected for the correction of a second magnetized amount, the second magnetized amount is computed at a step 5, on the basis of the data regarding the amount of heading change when the vehicle is turned and the output data from the terrestrial magnetism heading sensor before and after the vehicle is turned, by computing the center coordinates of the terrestrial magnetism heading circle wherein the angle defined by the both output data from the terrestrial magnetism heading sensor is equal to the data regarding the amount of heading change.

In the case that the aforesaid step 3 was processed or the aforesaid step 5 was processed, it is determined, at a step 6, whether the first magnetized amount or the second magnetized amount were computed. In the case that it was determined that either first magnetized amount or second magnetized amount were computed, it is determined, at a step 7, whether the difference between the computed magnetized amount and the previously used magnetized amount is more than a predetermined threshold value, that is, whether the vehicle is newly magnetized. In the case that it was determined that the difference was more than the predetermined threshold value, that is, in the case that it was determined that the vehicle was newly magnetized, the previously used magnetized amount is updated at a step 8 on the basis of the computed magnetized amount. On the other hand, in the case that it was determined that the difference was less than the predetermined threshold value, that is, in the case that it was determined that the vehicle was not newly magnetized, the previously used magnetized amount is corrected at a step 9 on the basis of the computed magnetized amount.

Thereafter, at a step 10, the heading data outputted from the terrestrial magnetism heading sensor is corrected on the basis of the updated or corrected magnetized amount. Finally, at a step 11, the present location data of a vehicle is computed on the basis of the corrected heading data and the distance data.

Figure 14:
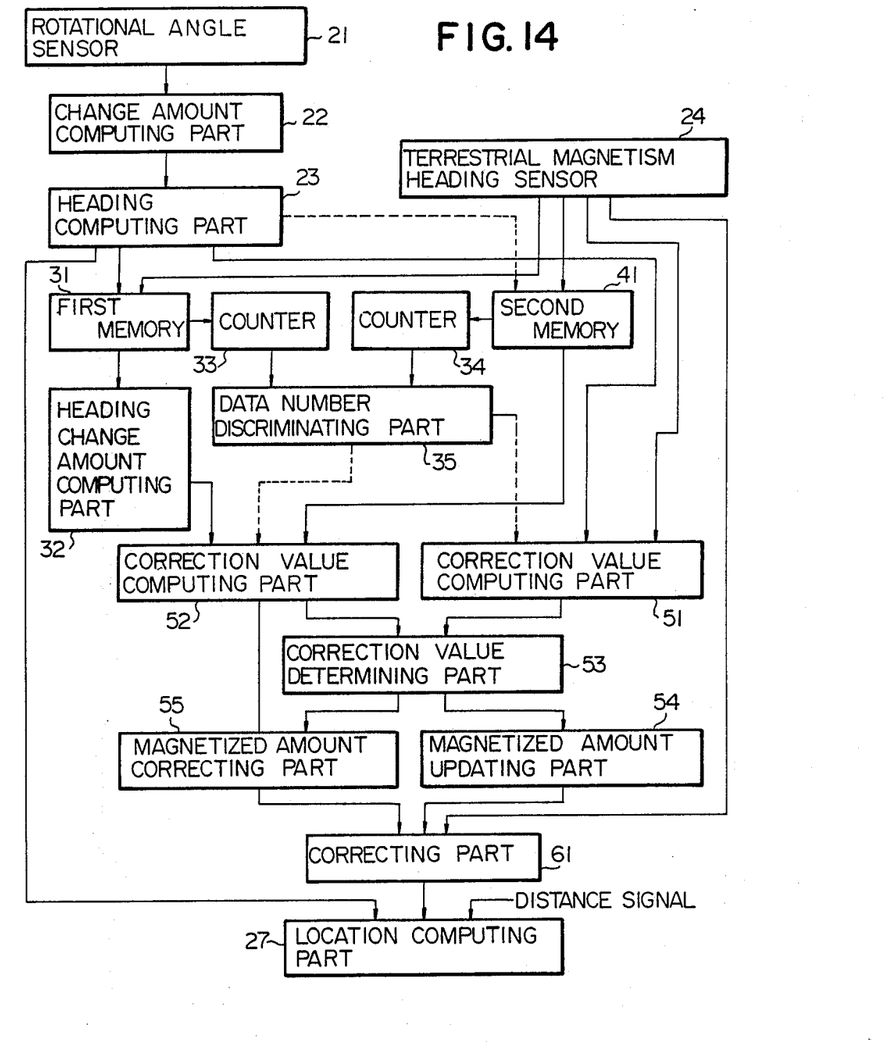
FIG. 14 is a block diagram showing the construction of a preferred apparatus for carrying out the method shown in FIG. 13.

Referring to FIG. 14, there is shown the construction of a preferred apparatus for carrying out the method shown in FIG. 13. The apparatus comprises a rotational angle sensor 21 (for example, a wheel velocity sensor), a change amount computing part 22 for computing the amount of the heading change of a vehicle upon a rotational angle signal from the rotational angle sensor 21, a heading computing part 23 for computing a present heading of the vehicle upon a heading change signal from the change amount computing part 22, a terrestrial magnetism heading sensor 24, a first memory 31 for storing therein output data from the heading computing part 23, a heding change amount computing part 32 for determining whether a vehicle is turned on the basis of the data stored in the first memory 31 and for computing data regarding the amount of heading change if the vehicle is turned, a second memory 41 for storing therein the output data from the terrestrial magnetism heading sensor 24 in correspondence with the output data from the heading computing part 23, a first counter 33 for counting the number of data stored in the first memory 31 in correspondence with whether the vehicle is turned, a second counter 34 for counting the number of data stored in the second memory 41 in correspondence with whether the vehicle is turned, a data number discriminating part 35 for comparing each of the count data in the first and second counters 33 and 34 with threshold data and producing three kinds of discrimination signals consisting of a first discrimination signal representing that the count data in the first memory 33 is more than the threshold value, a second discrimination signal representing that the count data in the second memory 34 is more than the threshold value and a third discrimination signal representing that both count data in the first and second memory 33 and 34 are less than the threshold value, and for controlling the operation of first and second correction value computing part 51 and 52 which will be described hereinafter, a first correction value computing part 51 for computing the center coordinates of a terrestrial magnetism heading circle on the basis of the heading signal from the heading computing part 23 and the heading signal from the terrestrial magnetism heading sensor 24 and for outputting the computed center coordinates as a correction value, a second correction value computing part 52 for computing the center coordinates of a terrestrial magnetism heading circle on the basis of the heading change amount data from the heading change amount computing part 32, and of the output data which are outputted from the terrestrial magnetism heading sensor 24 before and after the vehicle is turned and are read out from the second memory 41, and for outputting the computed center coordinates as a correction value, a correction value determining part 53 for computing the difference between the outputted correction value and the previously used correction value and determining whether the difference is less than a predetermined threshold value, a magnetized amount updating part 54 for updating either correction value to a new correction value on the basis of the output signal of the correction value determining part 53 representing that the difference is more than a predetermined threshold value, a magnetized amount correcting part 55 for correcting the previously used correction value on the basis of the output signal of the correction value determining part 53 representing that the difference is less than a predetermined threshold value and on the basis of the correction value outputted from the second correction value computing part 52, a correction part 61 for producing a corrected heading signal on the basis of the heading signal from the terrestrial magnetism heading sensor 24 and the new correction value signal from the magnetized amount updating part 54 or magnetized amount correcting part 55, and a location computing part 27 for computing the present location of a vehicle on the basis of either of the heading signal from the heading computing part 23 and the corrected heading signal from the correction part 61, and a distance signal (which is produced on basis of the output signal from the wheel velocity sensor and the like not shown).

More particularly, the aforementioned change amount computing part 22 maintains the output signal from the rotational angle sensor 21 and computes the amount of the heading change of a vehicle by computing the difference between the present output signal and the previous output signal. The aforementioned heading computing part 23 integrates the amount of the heading change obtained by the change amount computing part 22 and computes the heading signal by adding a reference value if necessary. On the basis of the data stored in the first memory 31, the aforementioned heading change amount computing part 32 determines whether the vehicle is turned by determining whether the amount of data change is more than a predetermined threshold value and computes heading change amount data in the case that the vehicle was turned. That is, on the basis of the heading data in the condition that the amount of data change is less than a predetermined threshold value, that is, on the basis of the heading data before and after the vehicle is turned, the difference between the two heading data is computed. The aforementioned first correction value computing part 51 computes a point which is spaced by the radius of the terrestrial magnetism heading circle in the direction which is spaced 180 degrees from the heading obtained by the heading computing part 23, on the basis of the heading signal from the terrestial magnetism heading sensor 24, and outputs the computed point as a correction value. The aforementioned second correction value computing part 52 computes the center coordinates of terrestrial magnetism heading circle on the assumption that two output data from the terrestrial magnetism heading sensor 24 before and after the vehicle is turned are located on the same terrestrial magnetism heading circle and also the angle defined by the two output data on the terrestrial magnetism heading circle is equal to the heading change amount data from the heading change amount computing part 32, and outputs the computed center coordinates as a correction value. The aforementioned magnetized amount updating part 54 updates the correction value, which is computed in the case that the vehicle is newly magnetized, to a new correction value. In the case that a correction value is computed in spite that the vehicle is not newly magnetized, the aforementioned magnetized amount correcting part 55 corrects the magnetized amount on the basis of the computed correction value. The aforementioned correction part 61 produces an accurate heading signal by subtracting the corrected value obtained by the magnetized amount updating part 54 or by the magnetized amount correcting part 55 from the heading signal from the terrestrial magnetism heading sensor 24. The aforementioned location computing circuit 27 computes the present location of a vehicle on the basis of the heading signal outputted from the heading computing part 23 and the distance signal, until the correction is made. After the correction is made, one location computing part 27 computes the present location of a vehicle on the basis of the accurate heading signal outputted from the correction part 61 and the distance signal.

The operation of the location detecting apparatus constructed as described above will hereinafter be described in detail.

In the case that the vehicle was magnetized when travelling in the direction of a heading $\theta 1$ (see FIG. 10), the output M of the terrestrial magnetism heading sensor 24 is shown by M(x1, y1) because the heading sensor 24 is subjected to the influence of the magnetized vehicle (see FIG. 11).

This output M indicates the heading $\theta 1$ with respect to the center of the terrestrial magnetism heading circle which is moved because of the influence of the magnetized vehicle and a heading 83 with respect to the origin of coordinates (see FIG. 11).

But, if the amount of the heading change of the vehicle is computed, on the basis of the rotational angle signal from the rotational angle sensor 21, by the change amount computing part 22, and the present heading of the vehicle is computed, on the basis of the change amount signal from the change amount computing 22, by the heading computing part 23, the aforesaid heading $\theta 1$ can be obtained. Although there exists a little error, the heading $\theta 1$ can be regarded as an accurate heading because the error is extremely small as compared with errors in the terrestrial magnetism heading sensor 24. And, in the correction value computing part 51, on the basis of the heading signal (x1, y1) from the terrestrial magnetism heading sensor 24, the point (dx, dy), which is spaced by the radius x of the terrestrial magnetism heading circle in the direction which is spaced 180 degrees from the heading $\theta 1$ obtained by the heading computing part 23, can be computed and outputted as a correction value. If $\theta 2$ (shown in FIG. 11) $=\theta 1-180°$, the dx and dy can be calculated as $$dx = x1 + x \cos(\theta 2),$$

$$dy = y1 + x \sin(\theta 2).$$

Accordingly, in the aforementioned correction part 61, an accurate heading signal can be obtained by subtracting the aforesaid correction value (dx, dy) from the heading signal (x1, y1) from the terrestrial magnetism heading sensor 24.

And, in the aforementioned location computing part 27, the present location of a vehicle can be computed on the basis of the aforesaid accurate heading from the correction part 61 and the distance signal.

Also, until the aforesaid correction value (dx, dy) is obtained, the present location of a vehicle is computed on the basis of the heading signal from the heading computing part 23 and the distance signal because the output signal M from the terrestrial magnetism heading sensor 24 cannot be used.

Figure 15:
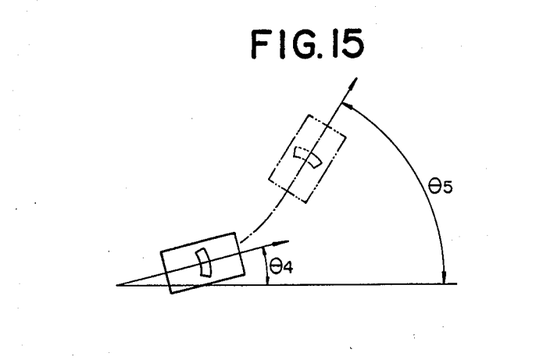
FIG. 15 schematically illustrates the condition that a vehicle is travelling in the direction of a heading $\theta 5$ from the condition that it is travelling in the direction of a heading $\theta 4$.
Figure 16:
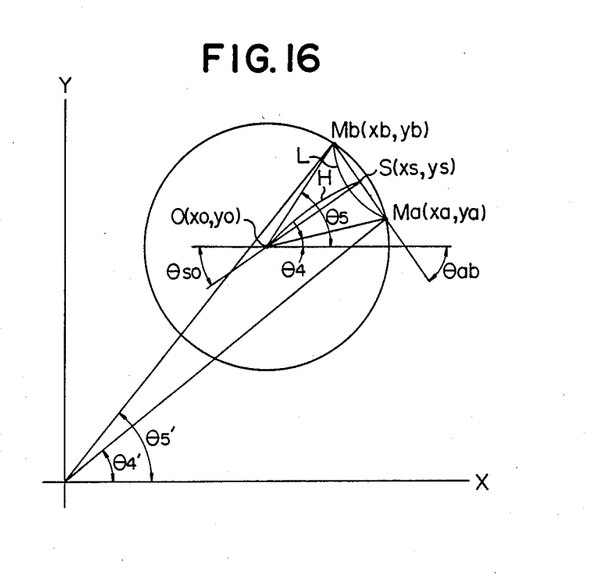
FIG. 16 is a view showing the output change of the terrestrial magnetism heading sensor when the vehicle is turned in the direction of the heading $\theta 5$ shown in FIG. 15 from the direction of the heading $\theta 4$ shown in FIG. 15.

In the case that the vehicle was magnetized in the condition that it is travelling in the direction of a heading $\theta 5$ from the condition that the vehicle is travelling in the direction of a heading $\theta 4$ (see FIG. 15), the output Ma and Mb of the terrestrial magnetism heading sensor 24 before and after the vehicle is turned are shown by (xa, ya) and (xb, yb), respectively, because the heading sensor 24 is subjected to the influence of the magnetized vehicle (see FIG. 16).

This output Ma indicates the heading $\theta 4$ with respect to the center of the terrestrial magnetism heading circle which is moved because of the influence of the magnetized vehicle and a heading $\theta 4'$ with respect to the origin of coordinates (see FIG. 16). Likewise, the output Mb indicates the heading $\theta 5$ with respect to the center of the terrestrial magnetism heading circle which is moved because of the influence of the magnetized vehicle and a heading $\theta 5'$ with respect to the origin of coordinates (see FIG. 16).

However, if the amount of the heading change of the vehicle is computed on the basis of the rotational angle signal from the rotational angle sensor 21 by the change amount computing part 22, and two headings of the vehicle before and after it is turned are computed, the aforesaid heading $\theta 4$ and heading $\theta 5$ can be obtained. Therefore, if the difference d$\theta$ between the heading $\theta 4$ and heading $\theta 5$ is computed, an angle defined by the output Ma and output Mb with respect to the center of the terrestrial magnetism heading circle which is moved because of the influence of the magnetized vehicle can be obtained. As a result, the center coordinates of the aforesaid terrestrial magnetism heading circle can be computed on the basis of the aforesaid output Ma, output Mb, difference $\theta 8$. In this case, a little error is involved in the heading $\theta 4$ and heading $\theta 5$ which are obtained on the basis of the output signal from the rotational angle sensor 21, but error is scarcely involved in the difference $d\theta$ between the heading $\theta 4$ and heading $\theta 5$. Accordingly, an accurate magnetized amount, that is, the center coordinates of the terrestrial magnetism heading circle can be computed as follows.

If, in FIG. 16, the coordinates S(xs, ys) of the middle point S between Ma and Mb and the length L between Ma and Mb are defined by the following equations:

$$S(xs, ys) = ((xa+xb)/2, (ya+yb)/2)$$

$$\text{Length } L = ((xa-xb)^2 + (ya-yb)^2)^{\frac{1}{2}},$$

the length H between the center O of the heading circle and the middle point S between Ma and Mb can be calculated by the following equation:

$$H = (L/2)/\tan(d\theta/2).$$

And, if the direction $\theta_{ab}$ of the vector Mab and the direction $\theta_{SO}$ of the vector SO are defined by the following equations:

$$\theta_{ab} = \tan^{-1}((yb-ya)/(xb-xa)) \quad (-\pi < \theta_{ab} < \pi)$$

$$\theta_{SO} = \theta_{ab} + \pi/2$$

the center coordinate O(xo, yo) of the aforementioned terrestrial magnetism heading circle can be calculated by the following equation:

$$(xo, yo) = (xs + H \cos(\theta_{SO}), ys + H \sin(\theta_{SO})).$$

In the case that the vehicle is traveling along road R, which traverses a rail crossing C, as shown in FIG. 12, when the vehicle passes the rail crossing C, a large magnetized amount occurs, and therefore, the heading (shown by the broken line in FIG. 12) detected by the terrestrial magnetism heading sensor 24 is greatly departed from the heading of the road R.

However, even this case, the heading b (shown by the broken line in FIG. 12) computed on the basis of the output signal from the rotational angle sensor 21 is substantially equal to the heading of the road R. Accordingly, on the basis of the heading b, a correction value with respect to the output signal from the terrestrial magnetism heading sensor 24 is computed, and thereafter, the present location of a vehicle can be detected on the basis of the output signal from the terrestrial magnetism heading sensor 24. More specifically, until the heading b is greatly departed from the heading of the road R after the vehicle passed the rail crossing R, the detectinn of the present location is made on the basis of the heading b, and the correction value with respect to the output signal from the terrestrial magnetism heading sensor 24 is computed. After the correction value is computed, the output signal from the terrestrial magnetism heading sensor 24 is corrected on the basis of the correction value and an accurate heading is obtained. Upon the accurate heading, the detection of the present location can be made.

And, when the vehicle is turned during vehicle travel, a high accurate magnetized amount can be computed on the basis of the amount of heading change wherein the influence of errors in the rotational angle sensor 21 is eliminated, and thereafter, a high accurate heading can be obtained by correcting the output signal from the terrestrial magnetism heading sensor 24 on the basis of the aforesaid high accurate magnetized amount. Thus, upon the high accurate heading, the detection of the present location can be made.

That is, since the condition that a vehicle travels straight is more frequent than the condition that a vehicle curves, in the case that the vehicle was magnetized, a relatively accurate magnetized amount is computed on the basis of the condition that a vehicle travels straight, a relatively accurate heading is obtained, and the detection of the present location is made. And, in the case that the vehicle was turned during vehicle travel, a high accurate magnetized amount is computed on the basis of the amount of the heading change, a high accurate heading is obtained, and the detection of the present location is made. As a result, when the vehicle was magnetized, the computation of the magnetized amount can made quickly, and the computation of a high accurate magnetized amount thereafter can be made.

It is noted that this invention is not limited to the aforementioned embodiment. For example, while it has been described that the correction value with respect to the terrestrial magnetism heading sensor 24 is computed on the basis of the heading b computed from the output signal from the rotational angle sensor 21, it is noted that, on road map which is stored as digital data, the correction value may also be computed on the basis of the heading of the road on which the vehicle is located. Also, it is determined whether a vehicle is located on the road which is stored as digital data, and the correction value with respect to the terrestrial magnetism heading sensor 24 may be computed on the basis of the heading of the road in the case that the vehicle is located on the road, and the aforesaid heading b in the case that the vehicle is not located on the road. Furthermore, a plurality of data are sampled by the terrestrial magnetism heading sensor 24, and by filtering or averaging the plurality of sample data to exclude the influence of deviation, etc. resulting from an elevated road, a bridge and the like, location output located on an accurate terrestrial magnetism heading circle can be obtained.

While certain representative embodiments and details have been shown for the purpose of illustrating the present invention, it will be apparent to those skilled in this art that various change and modifications may be made therein without departing from the spirit or scope of the invention.

From the foregoing description, it will be seen that an improved method, which is capable of correcting heading errors resulting from the magnetized vehicle by the magnetic field other than terrestrial magnetism, and an improved method, which is capable of correcting readily and accurately errors in a terrestrial magnetism heading sensor that result from the magnetized vehicle by the magnetic field other than terrestrial magnetism, without the turning travel of 360° of a vehicle, are afforded by the present design.

What we claim is:

1. In a location detecting apparatus which detects a location of a moving body on the basis of a heading signal from a terrestrial magnetism heading sensor attached to the moving body and a rotational angle signal from a rotational angle sensor attached to the moving body, a correcting method for correcting errors in said terrestrial magnetism heading sensor, comprising the steps of:

detecting an amount of a heading change of said moving body that is made when said moving body turns a curve, on the basis of said rotational angle signal from said rotational angle sensor, detecting a magnetized amount of said moving body on the basis of the detected amount of said heading change, an output from said terrestrial magnetism heading sensor before said heading change is made and an output from said terrestrial magnetism heading sensor after said heading change is made, and correcting said heading single on the basis of the detected magnetized amount.

2. In a location detecting apparatus which detects a location of a moving body on the basis of a heading signal from a terrestrial magnetism heading sensor attached to the moving body, a correcting method for correcting errors in said terrestrial magnetism heading sensor, comprising the steps of:

detecting an amount of a heading change of said moving body that is made when said moving body turns a curve, by calculating a difference between a present location and a previous location of said moving body which is located on a road map represented by road map data, detecting a magnetized amount of said moving body on the basis of the detected amount of said heading change, an output from said terrestrial magnetism heading sensor before said heading change is made an output from said terrestrial magnetism heading sensor after said heading change is made, and correcting said heading signal on the basis of the detected magnetized amount.

3. A correcting method as set forth on claim 1 or 2 in which said moving body comprises a vehicle.

4. In a location detecting apparatus which detects a location of a moving body on the basis of a heading signal from a terrestrial magnetism heading sensor attached to the moving body and a rotational angle signal from a rotational angle sensor attached to the moving body, a correcting method for correcting errors in said terrestrial magnetism heading sensor, comprising the steps of:

detecting an amount of a heading change in said moving body on the basis of said rotational angle signal, detecting a magnetized amount of said moving body on the basis of the detected amount of the heading change of said moving body and a radius of a terrestrial magnetism heading circle, and correcting said heading signal on the basis of the detected magnetized amount.

5. In a location detecting apparatus which detects a location of a moving body on the basis of a heading signal from a terrestrial magnetism heading sensor attached to the moving body, a correcting method for correcting errors in said terrestrial magnetism heading sensor, comprising the steps of:

detecting an amount of a heading change of said moving body, by calculating a difference between a present location and a previous location of said moving body which is located on a road map represented by road map data, detecting a magnetized amount of said moving body on the basis of the detected amount of the heading change of said moving body and a radius of a terrestrial magnetism heading circle, and correcting said heading signal on the basis of the detected magnetized amount.

6. In a location detecting apparatus which detects a location of a moving body on the basis of a heading signal from a terrestrial magnetism heading sensor attached to the moving body, a correcting method for correcting errors in said terrestrial magnetism heading sensor, comprising the steps of:

determining whether said moving body is located on a road represented in road map data, and in the case that said moving body is located on said road, detecting the amount of heading change of said moving body on the basis of a present location and a previous location of said moving body represented by said road map data, and in the case that said moving body is not located on said road, detecting the amount of heading change of said moving body on the basis of a rotational angle signal from a rotational angle sensor, detecting a magnetized amount of said moving body on the basis of the detected amount of the heading change of said moving body and a radius of a terrestrial magnetism heading circle, and correcting said heading signal on the basis of the detected magnetized amount.

7. A corresponding method as set forth in claim 4, 5, or 6 in which said moving body comprises a vehicle.

8. In a location detecting apparatus which detects a location of a moving body on the basis of a heading signal from a terrestrial magnetism heading sensor attached to the moving body and a rotational angle signal from a rotational angle sensor attached to the moving body, a correction method for correcting errors in said terrestrial magnetism heading sensor, comprising the steps of:

detecting a magnetized amount of said moving body on the basis of a heading of said moving body and a radius of a terrestrial magnetism heading circle, and if said moving body curves, detecting the amount of a heading change of said moving body on the basis of said rotational angle signal and detecting said magnetized amount of said moving body on the basis of the detected amount of heading change when said moving body curves and two output signals from said terrestrial magnetism heading sensor before and after said moving body curves, and correcting said heading signal on the basis of the detected magnetized amount.

9. In a location detecting apparatus which detects a location of a moving body on the basis of a heading signal from a terrestrial magnetism heading sensor attached to the moving body, a correcting method for correcting errors in said terrestrial magnetism heading sensor, comprising the steps of:

detecting a magnetized amount of said moving body on the basis of a heading of said moving body and a radius of a terrestrial magnetism heading circle, and if said moving body curves, detecting an amount of a heading change of said moving body by calculating the difference between the present location and the previous location of said moving body which is located on a road map represented by road map data and detecting a magnetized amount of said moving body on the basis of the detected amount of heading change when said moving body curves and two output signals from said terrestrial magnetism heading sensor before and after said moving body curves, and correcting said heading signal on the basis of the detected magnetized amount.

10. In a location detecting apparatus which detects a location of a moving body on the basis of a heading signal from a terrestrial magnetism heading sensor attached to the moving body, a correcting method for correcting errors in said terrestrial magnetism heading sensor, comprising the steps of:

detecting a magnetized amount of said moving body on the basis of a heading of said moving body and a radius of a terrestrial magnetism heading circle, and if said moving body curves, determining whether said moving body is located on a road represented in road map data, and in the case that said moving body is located on said road, detecting an amount of heading change of said moving body on the basis of a present location and a previous location of said moving body represented by said road map data, and in the case that said moving body is not located on said road, detecting the amount of heading change of said moving body on the basis of a rotational angle signal from a rotational angle sensor, and detecting a magnetized amount of said moving body on the basis of the detected amount of heading change when said moving body curves and two output signals from said terrestrial magnetism heading sensor before and after said moving body curves, and correcting said heading signal on the basis of the detected magnetized amount.

11. A correcting method as set forth in claim 8, 9, or 10 which said moving body comprises a vehicle.

* * * * *

UNITED STATES PATENT AND TRADEMARK OFFICE
CERTIFICATE OF CORRECTION

PATENT NO. : 4,862,398

DATED : Aug. 29, 1989

INVENTOR(S) : Toshiyuki Shimizu, et al.

It is certified that error appears in the above-identified patent and that said Letters Patent is hereby corrected as shown below:

The sheet of drawings, consisting of FIGS. 10-12, should be added as shown on the attached page.

Signed and Sealed this

Twenty-fourth Day of December, 1991

*Attest:*

HARRY F. MANBECK, JR.

*Attesting Officer*     *Commissioner of Patents and Trademarks*